US011523201B2

(12) United States Patent
Zhu

(10) Patent No.: US 11,523,201 B2
(45) Date of Patent: Dec. 6, 2022

(54) MULTIFUNCTIONAL MICROPHONE

(71) Applicant: SHANGHAI GREATCARE TRADING & DEVELOPING CO., LTD., Shanghai (CN)

(72) Inventor: Changliang Zhu, Shanghai (CN)

(*) Notice: Subject to any disclaimer, the term of this patent is extended or adjusted under 35 U.S.C. 154(b) by 30 days.

(21) Appl. No.: 17/230,895

(22) Filed: Apr. 14, 2021

(65) Prior Publication Data

US 2022/0312096 A1 Sep. 29, 2022

(51) Int. Cl.
| | |
|---|---|
| *H03G 5/00* | (2006.01) |
| *H04R 1/08* | (2006.01) |
| *G06F 3/16* | (2006.01) |
| *G10L 21/013* | (2013.01) |
| *G10H 1/36* | (2006.01) |
| *H04R 3/00* | (2006.01) |
| *H04R 1/02* | (2006.01) |

(52) U.S. Cl.
CPC ............. *H04R 1/086* (2013.01); *G06F 3/165* (2013.01); *G10H 1/361* (2013.01); *G10L 21/013* (2013.01); *H04R 1/025* (2013.01); *H04R 3/00* (2013.01); *G10H 2210/005* (2013.01); *G10L 2021/0135* (2013.01); *H04R 2420/07* (2013.01); *H04R 2420/09* (2013.01)

(58) Field of Classification Search
USPC .......................................................... 381/101
See application file for complete search history.

(56) References Cited

U.S. PATENT DOCUMENTS

| | | | | |
|---|---|---|---|---|
| 6,061,457 A | * | 5/2000 | Stockhamer | H04R 1/00 367/188 |
| 2004/0022052 A1 | * | 2/2004 | Chien | G09F 13/22 362/87 |
| 2008/0260194 A1 | * | 10/2008 | Pooley | H04R 1/06 381/361 |
| 2008/0282871 A1 | * | 11/2008 | Chen | G10H 1/363 84/610 |
| 2018/0220217 A1 | * | 8/2018 | Agyare | A61L 9/12 |
| 2021/0234566 A1 | * | 7/2021 | You | H04B 1/20 |
| 2022/0130360 A1 | * | 4/2022 | Tao | G10H 1/366 |

FOREIGN PATENT DOCUMENTS

CN 110459196 A * 11/2019

* cited by examiner

*Primary Examiner* — Ammar T Hamid

(57) ABSTRACT

A multifunctional microphone, includes a controlling mainboard; a sound collector electrically connected with the controlling mainboard; a speaker electrically connected with the controlling mainboard; and a sound adjusting module arranged on the controlling mainboard and configured to adjust sound collected by the sound collector.

20 Claims, 4 Drawing Sheets

MULTIFUNCTIONAL MICROPHONE

CROSS-REFERENCE TO RELATED APPLICATIONS

This patent application is based upon Chinese Patent Application No. 202120591502.1 filed on Mar. 23, 2021, the priority benefits of which are hereby claimed.

FIELD OF THE INVENTION

The subject matter herein generally relates to microphones, and more particularly to a multifunctional microphone.

BACKGROUND OF THE INVENTION

With the development of video technologies, more and more video applications like Tiktok®, Volcano micro video, Kwai short video, and Tencent® micro video have been developed. Many video applications allow people to sing karaoke anywhere anytime, such as at home, at supermarkets, or online with a microphone. However, existing microphones can only record sound. Speakers are used to connect with the microphones to replay recorded sound by such microphones. It is not only cumbersome and inconvenient to carry, but also unable to adjust the pitch, intonation and to mix sound. Which greatly affects user experience.

SUMMARY OF THE INVENTION

The present disclosure provides a multifunctional microphone which can resolve the above-mentioned technological problems.

A multifunctional microphone, includes a controlling mainboard; a sound collector electrically connected with the controlling mainboard; a speaker electrically connected with the controlling mainboard; and a sound adjusting module arranged on the controlling mainboard and configured to adjust sound collected by the sound collector.

In at least one embodiment, the sound adjusting module includes an automatic adjusting module configured to automatically adjust sound collected by the sound collector according to a predetermined intonation range.

In at least one embodiment, the sound adjusting module comprises an audition adjusting unit configured to compare audition to original singing to obtain an intonation difference, and to adjust intonation of the sound collected by the sound collector according to the intonation difference.

In at least one embodiment, the sound adjusting module comprises a recording adjusting unit configured to record sound collected by the sound collector and to remove sound beyond a predetermined intonation range.

In at least one embodiment, the sound adjusting module comprises a song adjusting unit configured to store recorded sound which is adjusted in the recording adjusting unit and automatically adjust user's sound based on the recorded sound.

In at least one embodiment, the multifunctional microphone further includes a wireless communication module configured to obtain song accompaniment from mobile terminal devices and a mixing adjusting module configured to adjust mixing effect of the sound collected by the sound collector and the song accompaniment.

In at least one embodiment, the case is defined with a sound inlet and a sound outlet, the sound collector is arranged inside the case corresponding to the sound inlet, and the speaker is arranged inside the case corresponding to the sound outlet.

In at least one embodiment, a first net cover is arranged at the sound inlet and a second net cover is arranged at the sound outlet.

In at least one embodiment, the first net cover is detachably connected with the case.

In at least one embodiment, a protective cover is arranged between the sound collector and the first net cover and configured to prevent saliva from entering the sound collector.

In at least one embodiment, the multifunctional microphone further includes at least one indicating lamp arranged inside the case and electrically connected with the controlling mainboard, wherein the at least one indicating lamp is configured to flash along with the sound outputted by the speaker.

In at least one embodiment, the number of the at least one indicating lamp is at least two, at least two indicating lamps arranged along the second net cover.

In at least one embodiment, the multifunctional microphone further includes at least one controlling button arranged on the case, wherein the at least one controlling button comprises at least one of: a power button configured to power on/off the microphone, a music volume adjustment button configured to change volume of a song or song accompaniment obtained from the mobile terminal devices, a mixing adjustment button configured to adjust mixing effect of the user's singing with the song and/or the song accompaniment, a singing volume adjustment button configured to change volume of user's sound collected by the sound collector, a bass volume adjustment button configured to change volume of bass of audio including user's sound, songs and/or song accompaniment, a pause/play button configured to pause/play songs and/or song accompaniment, an audio volume adjustment button configured to change volume of the audio wholly, a song switch button configured to switch songs and/or song accompaniment, and a light control button configured to control the indicating lamps, for example, turning on/off the indicating lamps, controlling the indicating lamps to flash at different modes.

In at least one embodiment, the case is further defined with at least one of a USB interface, a card interface and a power interface.

In at least one embodiment, the multifunctional microphone further includes a handle connected with the case.

In at least one embodiment, the handle comprises a supporting portion configured to support the microphone on a surface.

In at least one embodiment, the multifunctional microphone further includes an anti-slip mat arranged on the supporting portion and configured to prevent the microphone from slipping down.

In at least one embodiment, the anti-slip mat is an elastic plastic mat.

In at least one embodiment, the handle is detachably connected with the case.

In at least one embodiment, the multifunctional microphone further includes a power module electrically connected with the controlling mainboard, wherein the power module is arranged inside the handle.

The multifunctional microphone provided by the embodiments of the present disclosure includes both the sound collector and the speaker inside the case, thus has functions of both collecting user's sound and outputting user's sound without extra speakers. In addition, the multifunctional microphone includes the sound adjusting module arranged on the controlling mainboard, thus the sound collected by the sound collector can be adjusted by the sound adjusting module. The sound is adjusted by the sound adjusting module and then outputted by the speaker, therefore, the sound outputted by the speaker is clearer, more pleasant, closer to original singing, which greatly improves user's experience.

Additionally, the sound adjusting module includes the automatically adjusting unit which can automatically adjust sound collected by the sound collector according to a predetermined intonation range. It is simple enough for any user.

Additionally, the sound adjusting module includes an audition adjusting unit configured to compare audition to original singing to obtain an intonation difference, and to adjust intonation of the sound collected by the sound collector according to the intonation difference. The sound collected by the sound collector is adjusted based on the intonation difference, which can further improve adjusting effect, thus making the sound collected by the sound collector clearer, more pleasant, closer to original singing. Therefore, when a user sings a song through the multifunctional microphone, the user's singing may be closer to original singing, which will greatly improve user's experience.

In at least one embodiment, the sound adjusting module comprises a recording adjusting unit configured to record sound collected by the sound collector and to remove sound beyond a predetermined intonation range. The recording adjusting unit allow a user to record user's singing which is more satisfying which can be stored as a base for adjusting user's live singing.

In at least one embodiment, the sound adjusting module comprises a song adjusting unit configured to store recorded sound which is adjusted in the recording adjusting unit and automatically adjust user's sound based on the recorded sound. The sound collected by the sound collector is adjusted based on the recorded sound stored in the sound adjusting module, which will improve adjusting efficiency.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE ILLUSTRATED EMBODIMENT

Figure 1:
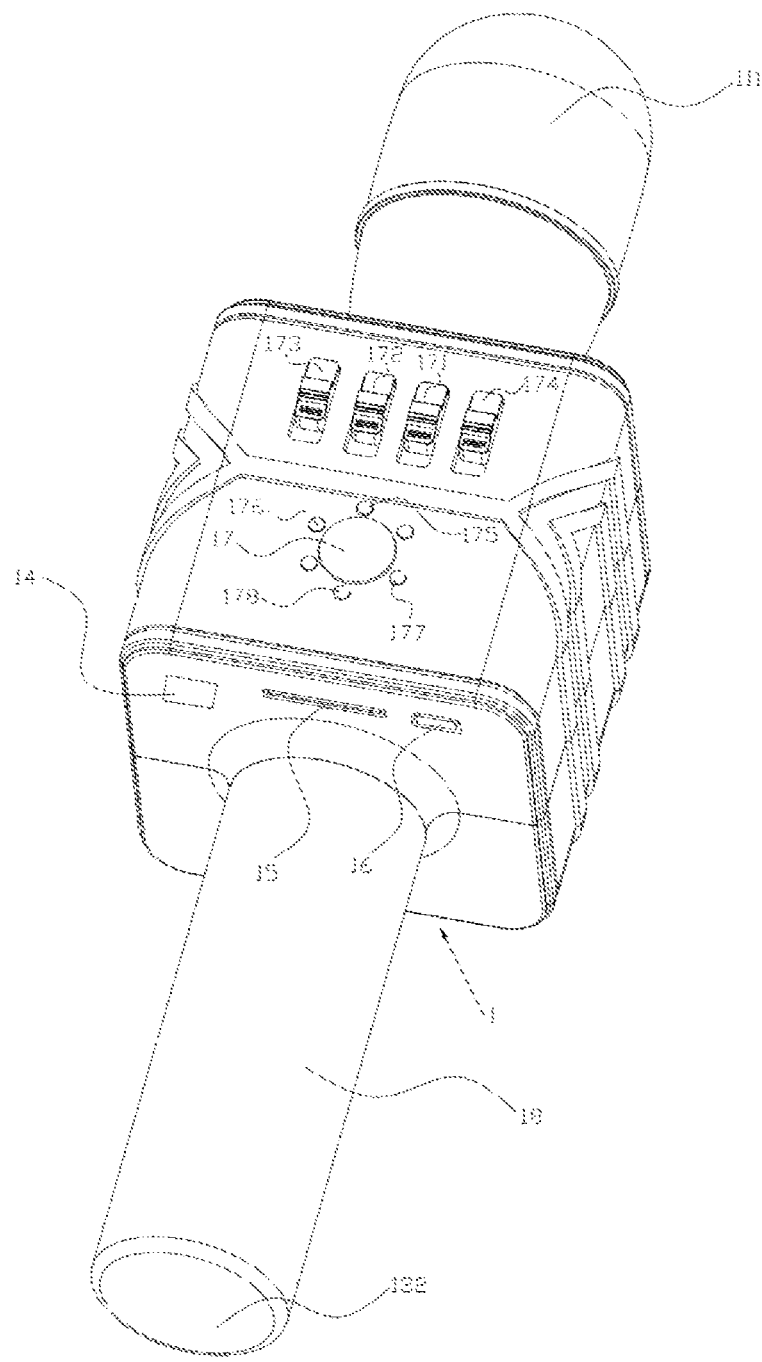
FIG. 1 is a schematic view of a multifunctional microphone according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Figure 2:
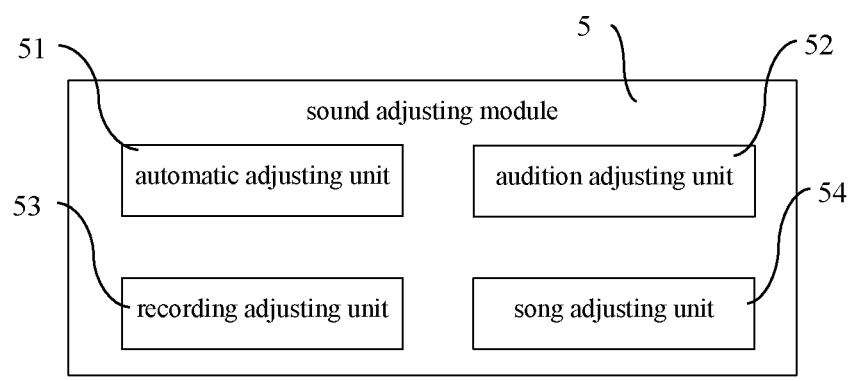
FIG. 2 is schematic view of a sound adjusting module of the multifunctional microphone according to an embodiment of the present disclosure.
Figure 3:
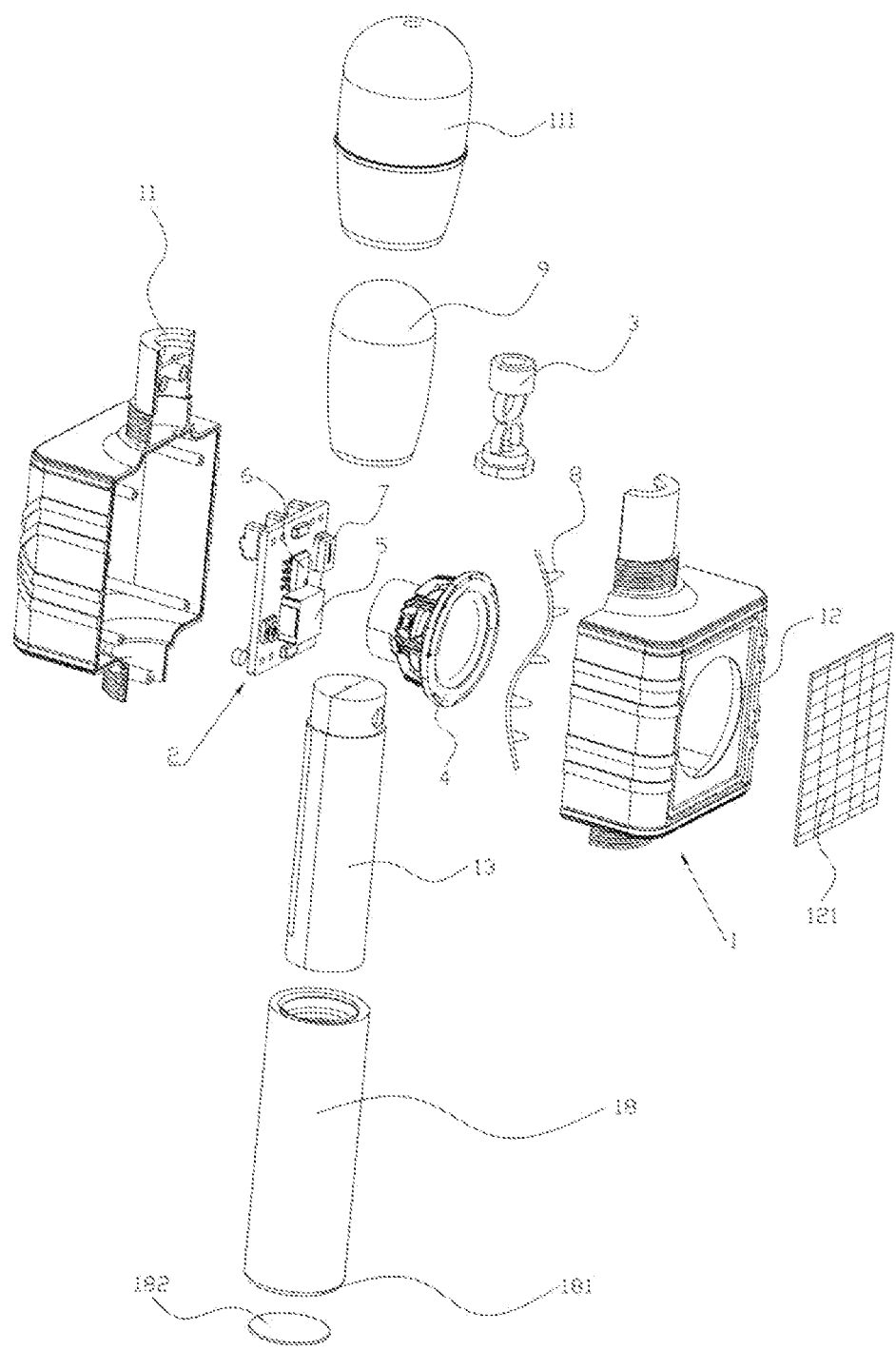
FIG. 3 is an exploded view of the multifunctional microphone of FIG. 1.
Figure 4:
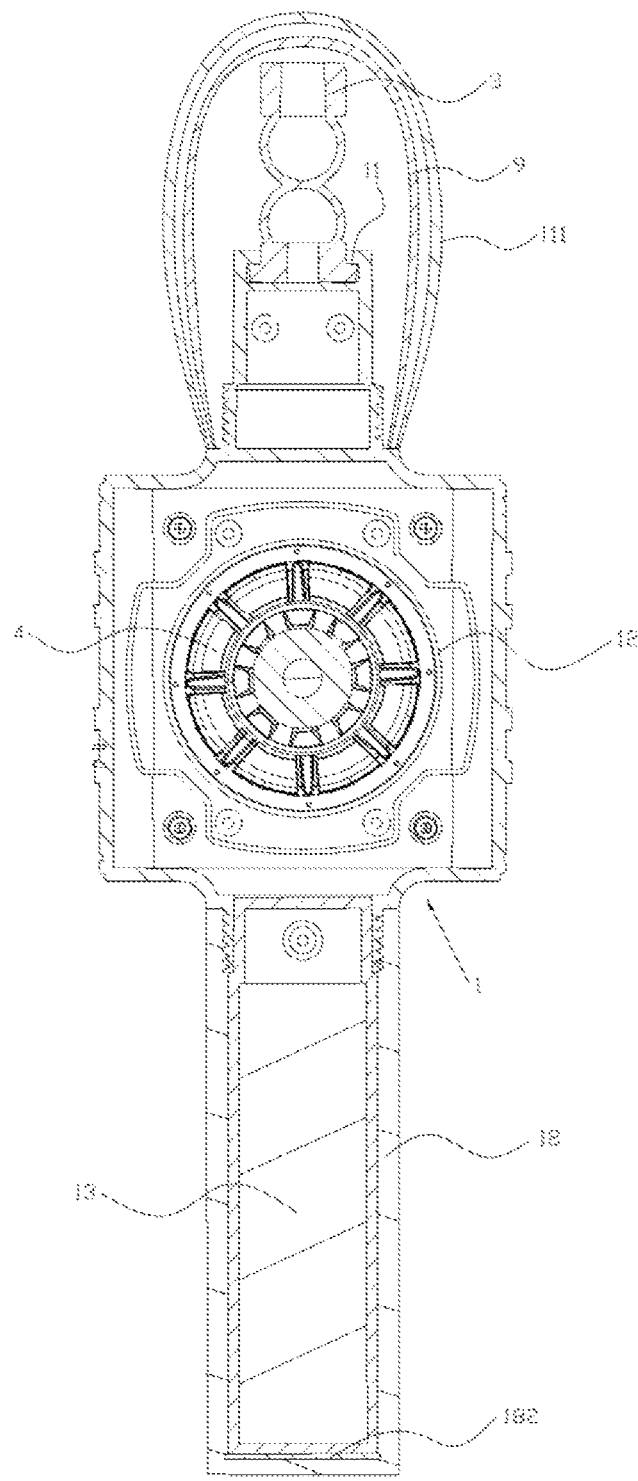
FIG. 4 is a cross-sectional view of the multifunctional microphone of FIG. 1.

Referring to FIGS. 1-2, an embodiment of the present disclosure provides a multifunctional microphone including a case 1, a controlling mainboard 2, a sound collector 3, and a speaker 4. The controlling mainboard 2, the sound collector 3, and the speaker 4 are arranged inside the case 1. The sound collector 3 and the speaker 4 are communicated with the controlling mainboard 2. A sound adjusting module 5 is arranged on the controlling mainboard 2. The sound adjusting module 5 includes an automatic adjusting unit 51, an audition adjusting unit 52, a recording adjusting unit 53, and a song adjusting unit 54. The automatic adjusting unit 51 is configured to automatically adjust sound collected by the sound collector 3 according to a predetermined intonation range. The audition adjusting unit 52 is configured to compare audition to original singing to obtain an intonation difference, and to adjust intonation of the sound collected by the sound collector 3 according to the intonation difference. The recording adjusting unit 53 is configured to record sound collected by the sound collector 3 and to remove sound beyond the predetermined intonation range. The song adjusting unit 54 is configured to store recorded sound which is adjusted in the recording adjusting unit 53 and automatically adjust user's sound based on the stored recorded sound.

The multifunctional microphone provided by the embodiment of the present disclosure includes the speaker 4 therein, thus being capable of both collecting sound and replaying sound without additional speakers. The multifunctional microphone is convenient for carrying. In addition, the sound adjusting module arranged on the controlling mainboard 2 can adjust intonation and pitch of the sound collected by the sound collector 3 automatically to make the sound outputted by the speaker 4 more clear, more pleasant, more close to original singing, thus making the user's singing more perfect.

The automatic adjusting unit 51 can automatically adjust intonation, pitch of the sound of the singer collected by the sound collector 3 according to a predetermined intonation range.

The audition adjusting unit 52 can compare audition to the original singing to obtain the difference between the audition and the original singing. The difference between the audition and the original singing is stored. User's singing can be adjusted based on the difference between the audition and the original singing, so as to make the user's singing closer to the original singing.

The recording adjusting unit 53 can record user's singing and allow a user to manually adjust recorded user's singing to remove portions beyond a predetermined intonation range, thus making recorded user's singing closer to the original singing.

After the recorded user's singing is adjusted, it is stored in the song adjusting unit. When the user sings the same song later, the user's singing can be automatically adjusted based on stored adjusted recorded user's singing, thus making user's live performance more clear, more pleasant, and more perfect.

In at least one embodiment, the controlling mainboard 2 includes a wireless communication module 6 and a mixing adjusting module 7. When the sound collector 3 receives sound, the sound adjusting module 5 automatically adjusts the sound. When the wireless communication module 6 receives song accompaniment from a mobile terminal device, the mixing adjustment module 7 is configured to adjust mixing effect of the sound collected by the sound collector 3 and the song accompaniment. Therefore, a user can adjust mixing effect of the sound collected by the sound collector 3 and the song accompaniment through the mixing adjustment module 7, thus making sound outputted by the speaker 4 clearer, more pleasant, closer to original singing. The wireless communication module 6 allows the microphone communicate with mobile terminal devices such as mobile phones to obtain songs or song accompaniment from the mobile terminal devices wirelessly, so that the speaker 4 can output the songs or the song accompaniment obtained from the mobile terminal devices. Therefore, user experiences can be improved.

In the embodiment, the case 1 is provided with a sound inlet 11 and a sound outlet 12. The sound collector 13 is arranged inside the case 1 corresponding to the sound inlet 11 and the speaker 4 is arranged inside the case 1 corresponding to the sound outlet 12. In at least one embodiment, a first net cover 111 is arranged at the sound inlet 11 and a second net cover 121 is arranged at the sound outlet 12 to prevent dust from going through the sound inlet 11 and the sound outlet 12 into an inside of the case 1. Therefore, user's sing can be transmitted to the sound collector 3 through the sound inlet 11 and then be magnified and outputted by the speaker 4 through the sound outlet 12. That is, the microphone has functions of both sound collecting and sound outputting.

In at least one embodiment, at least one indicating lamp 8 is arranged inside the case 1 and connected with the controlling mainboard 2. The indicating lamp 8 can be light-emitting diode (LED) or any other suitable lamp. In at least one embodiment, the indicating lamp 8 is arranged near the second net cover 121. In at least one embodiment, the number of the at least one indicating lamp 8 is at least two. At least two indicating lamps 8 are arranged along the second net cover 121. When user's sound is outputted by the speaker 4, the indicating lamp 8 can flash along with user's sound. The flashing light emitted by the indicating lamp 8 is spread outside the microphone through the second net cover 121. The light together with user's singing creates a dreaming light atmosphere like in a karaoke. In at least one embodiment, the number of the indicating lamps 8 can be 20-30 and arranged in four rows along the second net cover 121. In at least one embodiment, the indicating lamps 8 can include red LEDs, green LEDs, and blue LEDs. The controlling mainboard 2 can control the indicating lamps 8 to flash to achieve dynamic effects like a trotting horse lamp, which allows a user to immerse himself in the dreaming atmosphere to sing. Therefore, user's experience is further enhanced.

In at least one embodiment, a power module 13 is arranged inside the case 1. The power module 13 is electrically connected with the controlling mainboard 2. The power module 13 can be a lithium battery or other suitable battery. The power module 13 can supply power to the microphone. The lithium battery can be recharged, therefore, it does not to change the battery repeatedly, which greatly improves convenience of the microphone in use and prolongs the service life of the microphone.

In at least one embodiment, a USB (Universe Serial Bus) interface 14, a card interface 15 and a power interface 16 are arranged on the case 1. Therefore, the microphone not only can communicated with mobile devices through the wireless communication module 6 to obtain songs or song accompaniment, but also can communicate with mobile devices or mobile storage devices through the USB interface 14 to obtain songs or song accompaniment. In addition, data cards like SD cards or TF cards can be inserted into the card interface 15, so that the microphone can obtain songs or song accompaniment from the data cards. Therefore, the microphone can be used in many occasions, which greatly increase functions of the microphone.

In at least one embodiment, a protective cover 9 is arranged between the sound collector 3 and the first net cover 111 and configured to prevent saliva from entering the sound collector 3 through the first net cover 111.

In at least one embodiment, the first net cover 111 is detachably connected with the case 1. The protective cover 9 can prevent saliva from entering the sound collector 3, thus protecting the sound collector from being stained or damaged, and keeping the sound collector 3 clean, which can reduce frequency of maintaining or cleaning the sound collector 3. Detachable connecting of the first net cover 111 with the case 1 is convenient for cleaning, maintaining or change the first net cover 111 and the protective cover 9.

In at least one embodiment, multiple controlling buttons are arranged on the case 1. The controlling buttons can include, but not limited to, a power button 17, a music volume adjustment button 171, a mixing adjustment button 172, a singing volume adjustment button 173, a bass volume adjustment button 174, a pause/play button 175, an audio volume adjustment button 176, a song switch button 177, and a light control button 178. The power button 17 is configured to open or close the microphone. The music volume adjustment button 171 is configured to change volume of the song or song accompaniment obtained from the mobile terminal devices. The mixing adjustment button 172 is configured to adjust mixing effect of the user's singing with the song and/or the song accompaniment. The singing volume adjustment button 173 is configured to change volume of user's sound collected by the sound collector 3. The bass volume adjustment button 174 is configured to change volume of bass of audio including user's sound, songs and/or song accompaniment. The pause/play button 175 is configured to pause/play songs and/or song accompaniment. The audio volume adjustment button 176 is configured to change volume of the audio wholly. The song switch button 177 is configured to switch songs and/or song accompaniment. The light control button 178 is configured to control the indicating lamps 8, for example, turning on/off the indicating lamps 8, controlling the indicating lamps 8 to flash at different modes which includes controlling the indicating lamps 8 to flash at different frequencies.

In at least one embodiment, the microphone further includes a handle 18 connected with the case 1. The handle 18 includes a supporting portion 181 configured to support the microphone on a surface like a table. In at least one embodiment, an anti-slip mat 182 is arranged on the supporting portion 181. The anti-slip mat 182 is configured to increase fiction between the microphone 1 and the surface to prevent the microphone from slipping down. In at least one embodiment, the anti-slip mat can be elastic plastic mat.

In at least one embodiment, the handle 18 is detachably connected with the case 1, and the power module 13 is arranged inside the handle 18. Therefore, it is convenient for cleaning and changing the handle 18 and the power module 13.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A multifunctional microphone, comprising:
    a controlling mainboard;
    a sound collector, electrically connected with the controlling mainboard;
    a speaker, electrically connected with the controlling mainboard;
    a sound adjusting module arranged on the controlling mainboard and configured to adjust sound collected by the sound collector,
    a case accommodating the controlling mainboard, the sound collector and the speaker, and
    at least one controlling button arranged on the case, wherein the at least one controlling button comprises at least one of: a power button configured to power on/off the microphone, a music volume adjustment button configured to change volume of a song or song accompaniment obtained from the mobile terminal devices, a mixing adjustment button configured to adjust mixing effect of the user's singing with the song and/or the song accompaniment, a singing volume adjustment button configured to change volume of user's sound collected by the sound collector, a bass volume adjustment button configured to change volume of bass of audio including user's sound, songs and/or song accompaniment, a pause/play button configured to pause/play songs and/or song accompaniment, an audio volume adjustment button configured to change volume of the audio wholly, a song switch button configured to switch songs and/or song accompaniment, and a light control button configured to control the indicating lamps to turn on/off the indicating lamps and control the indicating lamps to flash at different modes.

2. The multifunctional microphone according to claim 1, wherein the sound adjusting module comprises an automatic adjusting module configured to automatically adjust sound collected by the sound collector 3 according to a predetermined intonation range.

3. The multifunctional microphone according to claim 1, wherein the sound adjusting module comprises an audition adjusting unit configured to compare audition to original singing to obtain an intonation difference, and to adjust intonation of the sound collected by the sound collector according to the intonation difference.

4. The multifunctional microphone according to claim 1, wherein the sound adjusting module comprises a recording adjusting unit configured to record sound collected by the sound collector and to remove sound beyond a predetermined intonation range.

5. The multifunctional microphone according to claim 4, wherein the sound adjusting module comprises a song adjusting unit configured to store recorded sound which is adjusted in the recording adjusting unit and automatically adjust user's sound based on the recorded sound.

6. The multifunctional microphone according to claim 1, further comprising a wireless communication module configured to obtain song accompaniment from mobile terminal devices and a mixing adjusting module configured to adjust mixing effect of the sound collected by the sound collector and the song accompaniment.

7. The multifunctional microphone according to claim 1, wherein the case is defined with a sound inlet and a sound outlet, the sound collector is arranged inside the case corresponding to the sound inlet, and the speaker is arranged inside the case corresponding to the sound outlet.

8. The multifunctional microphone according to claim 7, wherein a first net cover is arranged at the sound inlet and a second net cover is arranged at the sound outlet.

9. The multifunctional microphone according to claim 8, wherein the first net cover is detachably connected with the case.

10. The multifunctional microphone according to claim 8, wherein a protective cover is arranged between the sound collector and the first net cover and configured to prevent saliva from entering the sound collector.

11. A multifunctional microphone, comprising:
    a controlling mainboard;
    a sound collector, electrically connected with the controlling mainboard;
    a speaker, electrically connected with the controlling mainboard;
    a sound adjusting module arranged on the controlling mainboard and configured to adjust sound collected by the sound collector,
    a case accommodating the mainboard, the sound collector and the speaker,
    at least one indicating lamp arranged inside the case and electrically connected with the controlling mainboard, wherein the at least one indicating lamp is configured to flash along with the sound outputted by the speaker, the case is defined with a sound inlet and a sound outlet, the sound collector is arranged inside the case corresponding to the sound inlet, and the speaker is arranged inside the case corresponding to the sound outlet, a first net cover is arranged at the sound inlet and a second net cover is arranged at the sound outlet, the number of the at least one indicating lamp is at least two, at least two indicating lamps arranged along the second net cover.

12. The multifunctional microphone according to claim 1, further comprising a handle connected with the case.

13. The multifunctional microphone according to claim 12, wherein the handle comprises a supporting portion configured to support the microphone on a surface.

14. The multifunctional microphone according to claim 13, further comprising an anti-slip mat arranged on the supporting portion and configured to prevent the microphone from slipping down.

15. The multifunctional microphone according to claim 12, wherein the handle is detachably connected with the case.

16. The multifunctional microphone according to claim 15, further comprising a power module electrically connected with the controlling mainboard, wherein the power module is arranged inside the handle.

17. The multifunctional microphone according to claim 11, wherein when user's sound is outputted by the speaker, the indicating lamp flashes along with the user's sound.

18. The multifunctional microphone according to claim 11, wherein the number of the indicating lamps range from 20-30 and are arranged in four rows along the second net cover.

19. The multifunctional microphone according to claim 11, wherein the indicating lamps include red LEDs, green LEDs, and blue LEDs.

20. The multifunctional microphone according to claim 11, wherein the controlling mainboard are configured to control the indicating lamps to flash to achieve dynamic effects like a trotting horse lamp.

* * * * *